US012693509B2

(12) United States Patent　　　(10) Patent No.:　US 12,693,509 B2

Brindak et al.　　　　　　　　　　(45) Date of Patent:　　　Jul. 28, 2026

(54) HIGH NUMERICAL APERTURE IMAGING DEVICE

(71) Applicant: Navitar, Inc., Rochester, NY (US)

(72) Inventors: Michael Brindak, Rochester, NY (US); Yiyi Guan, Rochester, NY (US); Julian Goldstein, Palm Beach, FL (US); Russell Hudyma, Alamo, CA (US); Liang Guan, Rochester, NY (US); Jason Ewanow, Rochester, NY (US); Matthew Derosa, Rochester, NY (US); Christopher Riley, Rochester, NY (US)

(73) Assignee: Navitar, Inc., Rochester, NY (US)

( * ) Notice: Subject to any disclaimer, the term of this patent is extended or adjusted under 35 U.S.C. 154(b) by 292 days.

(21) Appl. No.: 18/686,394

(22) PCT Filed: Aug. 23, 2022

(86) PCT No.: PCT/US2022/041280

§ 371 (c)(1),
(2) Date: Feb. 23, 2024

(87) PCT Pub. No.: WO2023/043590

PCT Pub. Date: Mar. 23, 2023

(65) Prior Publication Data

US 2024/0402476 A1　　Dec. 5, 2024

Related U.S. Application Data

(60) Provisional application No. 63/310,613, filed on Feb. 16, 2022, provisional application No. 63/236,233, filed on Aug. 23, 2021.

(51) Int. Cl.
*G02B 21/02*　　　(2006.01)
*G02B 27/00*　　　(2006.01)

(52) U.S. Cl.
CPC ......... *G02B 21/02* (2013.01); *G02B 27/0081* (2013.01)

(58) Field of Classification Search
CPC ...... G02B 21/00; G02B 21/025; G02B 21/02; G02B 27/0081

(Continued)

(56) References Cited

U.S. PATENT DOCUMENTS

| | | | | |
|---|---|---|---|---|
| 4,884,880 A | * | 12/1989 | Lichtman | G02B 21/0028 |
| | | | | 359/227 |
| 2010/0014154 A1 | * | 1/2010 | Matsui | G02B 21/248 |
| | | | | 359/380 |

(Continued)

FOREIGN PATENT DOCUMENTS

| | | | |
|---|---|---|---|
| WO | 2021/037342 A1 | 3/2021 | |
| WO | 2022/132889 A1 | 6/2022 | |
| WO | 2023/043590 A1 | 8/2023 | |

OTHER PUBLICATIONS

PCT International Search Report, Written Opinion of the International Searching Authority, Search History, for PCT Application No. PCT/US22/41280, report dated Jan. 17, 2023, 15 pages.

*Primary Examiner* — William R Alexander

(74) *Attorney, Agent, or Firm* — SF Bay Area Patents, LLC; Andrew V. Smith

(57) ABSTRACT

A microscope assembly includes an objective lens and an infinite conjugate tube lens. The effective focal length of the objective lens is not greater than 80 mm. The numerical aperture of the microscope is 0.14 or more. The microscope exhibits a magnification of 2× or more.

20 Claims, 16 Drawing Sheets

(58) Field of Classification Search
USPC .......................................................... 359/368
See application file for complete search history.

(56) References Cited

U.S. PATENT DOCUMENTS

| | | | |
|---|---|---|---|
| 2016/0054554 A1* | 2/2016 | Tamano | G02B 21/16 |
| | | | 359/363 |
| 2016/0062100 A1* | 3/2016 | Cohen | G02B 3/0006 |
| | | | 348/79 |
| 2017/0023781 A1 | 1/2017 | Wang et al. | |
| 2018/0217365 A1* | 8/2018 | Byler | G02B 13/24 |
| 2018/0307021 A1* | 10/2018 | Schulz | G02B 21/02 |
| 2021/0222239 A1* | 7/2021 | Chen | C12N 15/1006 |
| 2022/0099953 A1* | 3/2022 | Eisenberg | G02B 21/0008 |

* cited by examiner

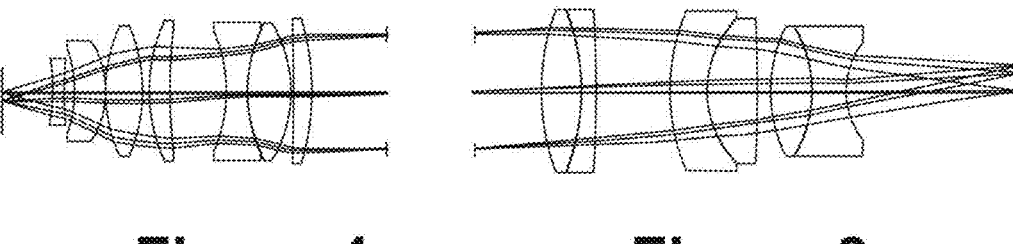
Figure 1          Figure 3
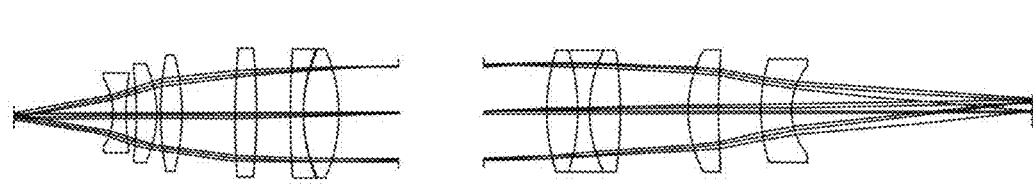
Figure 2          Figure 4

SingleShot ™ Wide FOV 4K Objective Lens System

OBJECTIVE LENS SPECIFICATION TABLE

STANDARD OBECTIVES

| | 160 mm Tube Lens | 110 mm Tube Lens | 80 mm Objective | 53 mm Objective |
|---|---|---|---|---|
| Aperture Size (mm) | 30.00 | 30.00 | 30.00 | 30.00 |
| EFL (mm) | 160 | 110 | 80 | 53 |
| F-number | 5.33 | 3.67 | 2.67 | 1.67 |
| NA | 0.093 | 0.133 | 0.184 | 0.271 |
| Wavelength (nm) | 445-655 | 445-655 | 445-655 | 445-655 |
| Zoom | Digital | Digital | Digital | Digital |
| Distortion (%) | 0.80 | 0.70 | 0.50 | 0.15 |
| Working Distance (mm) | 50 | 39 | 25 | 12 |
| Min Feature Size (µm) | 3.59 | 2.53 | 1.82 | 1.24 |

Figure 31

SingleShot™ Wide Field of View Objective Lens System

FIELD OF VIEW MATRIX

| OBJECTIVE LENS | TUBE LENS | | | | 110 mm 1-290419 | 160 mm 1-290070 |
|---|---|---|---|---|---|---|
| | Pixel Resolution (um) | | | | 1.26 | 1.80 |
| | W.D. (mm) | DOF (mm) | Res. Limit (um) | Format | Diagonal | |
| 160 mm NA: 0.093 1-290070 | 50 | 0.057 | 3.59 | Mag. | 0.71 | 1.00 |
| | | | | 2/3" | 15.48 | 10.98 |
| | | | | 1" | 22.52 | 15.98 |
| | | | | 1.1" | 24.6 | 17.46 |
| | | | | 1.2" | 27.16 | 19.27 |
| | | | | 4/3" | 31.67 | 22.47 |
| 110 mm NA: 0.133 1-290419 | 39 | 0.026 | 2.53 | Mag. | 1.01 | 1.41 |
| | | | | 2/3" | 10.92 | 7.78 |
| | | | | 1" | 15.88 | 11.32 |
| | | | | 1.1" | 17.36 | 12.36 |
| | | | | 1.2" | 19.16 | 13.65 |
| | | | | 4/3" | 22.33 | 15.91 |
| 80 mm NA: 0.184 1-290069 | 25 | 0.015 | 1.82 | Mag. | 1.40 | 2.01 |
| | | | | 2/3" | 7.88 | 5.47 |
| | | | | 1" | 11.46 | 7.96 |
| | | | | 1.1" | 12.52 | 8.70 |
| | | | | 1.2" | 13.83 | 9.60 |
| | | | | 4/3" | 16.12 | 11.20 |
| 53 mm NA: 0.271 1-290418 | 12 | 0.007 | 1.24 | Mag. | 2.09 | 3.01 |
| | | | | 2/3" | 5.26 | 3.65 |
| | | | | 1" | 7.65 | 5.32 |
| | | | | 1.1" | 8.35 | 5.81 |
| | | | | 1.2" | 9.22 | 6.41 |
| | | | | 4/3" | 10.75 | 7.47 |

Figure 32

80mm
Objective

160mm
Objective

110mm
Objective

53mm
Objective

HIGH NUMERICAL APERTURE IMAGING DEVICE

PRIORITY AND RELATED APPLICATIONS

This application is a 371 of PCT/US22/41280, filed Aug. 23, 2022; which claims the benefit of priority to U.S. provisional patent applications Nos. 63/236,233, filed Aug. 23, 2021, and 63/310,613, filed Feb. 16, 2022, which are each incorporated by reference.

BACKGROUND

Many, if not most, 2× microscope objectives in the market work with 180 mm/200 mm tube lenses, and their numerical aperture, or NA, is typically less than 0.1.

One of Applicant's 2× objective lenses has NA=0.14, although this 2× objective lens is attached to a zoom lens system and is not a high resolution infinity corrected objective lens. Another previous 2× objective lens of Applicant that does exhibit high resolution infinity corrected performance has a numerical aperture NA=0.08 (Navitar 1-55273). It is desired to have 2× microscope objectives with higher numerical apertures, e.g., above 0.1, and even 0.14 and higher. It is also desired to have microscopes with larger entrance pupils and larger fields of view that exhibit higher numerical apertures for resolving smaller features in the larger fields of view.

BRIEF DESCRIPTION OF THE DRAWINGS

FIG. 1 is a lens diagram of a lens assembly with an effective focal length (EFL) of 53 mm and a numerical aperture (NA) of 0.27 in accordance with an example embodiment.

FIG. 2 is a lens diagram of a lens assembly with an effective focal length (EFL) of 80 mm and a numerical aperture (NA) of 0.18 in accordance with an example embodiment.

FIG. 3 is a lens diagram of a lens assembly with an effective focal length (EFL) of 110 mm and a numerical aperture (NA) of 0.14 in accordance with an example embodiment.

FIG. 4 is a lens diagram of a lens assembly with an effective focal length (EFL) of 160 mm and a numerical aperture (NA) of 0.094 in accordance with an example embodiment.

FIG. 31 is a table that includes certain configuration specifications for the example lens assemblies that are illustrated schematically at FIGS. 1-20.

FIG. 32 is a table that includes certain information regarding the example lens assemblies that are illustrated schematically at FIGS. 1-20.

DETAILED DESCRIPTIONS OF EXAMPLE EMBODIMENTS

Figure 5:
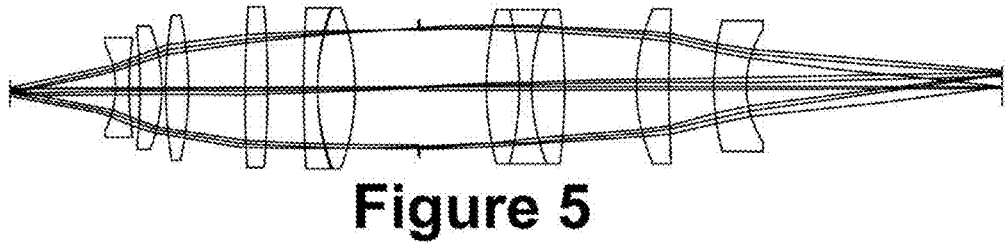
FIG. 5 is a lens diagram of a 2× microscope assembly including an 80 mm EFL objective lens and a 160 mm EFL tube lens having NA=0.18 in accordance with an example embodiment.

A lens system in an example embodiment includes an infinite conjugate tube lens and objective lens combination with a large entrance pupil diameter (EPD) and a large field of view (FOV). In an example embodiment, a lens system may include a longer focal length objective. By enlarging the EPD, a higher numerical aperture (NA) is achieved for resolving smaller features in an enlarged FOV. In an example embodiment, a FOV may be doubled or enlarged by more than 2.5× compared with conventional systems with more limited resolving power.

In an example embodiment, a microscope assembly kit is provided that includes four example lens assemblies that are schematically illustrated at FIGS. 1-4. These four example lens assemblies are designed with four unique combinations of numerical aperture and effective focal length.

The lens assembly that is schematically illustrated at FIG. 1 includes a biconcave lens, a concavo-convex lens, a biconvex lens, a convexo-planar or convexo-quasi-planar lens, a doublet including a biconcave lens coupled to a biconvex lens, and a plano-convex or quasi-plano-convex lens. The lens assembly of FIG. 1 includes six lens elements including seven lenses, wherein the doublet is referred to as a lens element formed by coupling two lenses together. The lens assembly of FIG. 1 exhibits a numerical aperture of 0.27 and an effective focal length of 53 mm. An optical prescription of the lens assembly of FIG. 1 is provided at Table F1.

The lens assembly that is schematically illustrated at FIG. 2 includes a biconcave, concavo-quasi-planar or concavo-planar lens, a plano-convex or quasi-plano-convex lens, a biconvex lens, a quasi-biplanar biconvex lens, and a doublet including a plano-concave or quasi-plano-concave lens coupled to a biconvex lens. The lens assembly of FIG. 2 includes five lens elements including six lenses, wherein the doublet is referred to as a lens element formed by coupling two lenses together. The lens assembly of FIG. 2 exhibits a numerical aperture of 0.18 and an effective focal length of 80 mm. An optical prescription of the lens assembly of FIG. 2 is provided at Table F2.

The lens assembly that is schematically illustrated at FIG. 3 includes three doublets. A first doublet includes a biconvex lens coupled to a concavo-planar or concavo-quasi-planar lens. A second doublet includes a convexo-concave lens coupled to a biconvex, convexo-quasi-planar or convexo-planar lens. A third doublet includes a biconvex lens coupled to a biconcave lens. The lens assembly of FIG. 3 includes three lens elements including six lenses, wherein each of the three doublets is a lens element formed by coupling two lenses together. The lens assembly of FIG. 3 exhibits a numerical aperture of 0.14 and an effective focal length of 110 mm. An optical prescription of the lens assembly of FIG. 3 is provided at Table F3.

The lens assembly that is schematically illustrated at FIG. 4 includes a triplet including a pair of biconvex lenses coupled each to one side of a biconcave lens, a convexo-concave, convexo-quasi-planar or convexo-quasi-planar lens and a convexo-concave lens. The lens assembly of FIG. 4 includes three lens elements including five lenses, wherein the triplet is referred to as a lens element formed by coupling three lenses together. The lens assembly of FIG. 4 exhibits a numerical aperture of 0.094 and an effective focal length of 160 mm. An optical prescription of the lens assembly of FIG. 4 is provided at Table F4.

From the four lens assemblies of FIGS. 1-4, sixteen objective-tube lens combinations that are schematically illustrated at FIGS. 5-20 can be assembled, including two combinations that exhibit 2× magnification with numerical apertures above NA=0.14, specifically NA=0.18 and NA=0.27, and one combination that exhibits 3× magnification with a numerical aperture above NA=0.14, specifically NA=0.27. Optical prescriptions for each of the lens assemblies that are schematically illustrated at FIGS. 5-20 are provided as combinations of Tables F1-F4.

In one example, a microscope assembly kit may include lens assemblies with effective focal lengths of 53 mm, 80 mm, 110 mm, and 160 mm, individually. Magnifications of pairs of these lens assemblies may be found in a range between 0.34× and 3×, which are achieved in sixteen (16) combinations of these four effective focal lengths.

In another example, a microscope assembly kit may include lens assemblies with numerical apertures of 0.094, 0.14, 0.18 and 0.27. Four unique objective lens-tube lens combinations are provided at each of these four numerical apertures with the sixteen (16) possible combinations of four lens assemblies.

In another example, a microscope assembly kit may include lens assemblies with, respectively, effective focal lengths of 53 mm, 80 mm, 110 mm, and 160 mm, and numerical apertures of 0.27, 0.18, 0.14 and 0.094. Each of these units has a diffraction limited performance. Any two of these four units can form into a configuration including an objective lens and a tube lens disposed on opposites sides of an aperture stop. Images can be formed of objects and scenes within a field of view on either side of the configuration. Whichever configuration is disposed on the object side of the aperture stop serves as an objective lens and the configuration that is disposed on the image side of the aperture stop serves as a tube lens or rear adapter lens assembly.

In another example embodiment that is illustrated schematically at FIG. 5, a 2× magnification microscope assembly is provided that includes an objective lens assembly and a tube lens assembly that has a numerical aperture NA=0.18 in a configuration where the objective lens assembly has an effective focal length EFL=80 mm and the tube lens assembly has an effective focal length EFL=160 mm.

The example lens assembly for a 2× magnification microscope assembly that is illustrated schematically in FIG. 5 exhibits a focal length of 45 mm. The working F/# is 5. The maximum image size is 20 mm. The working wavelength range is 445 nm-655 nm. The working distance is 30 mm. The resolving power is 1.9 microns.

Figure 6:
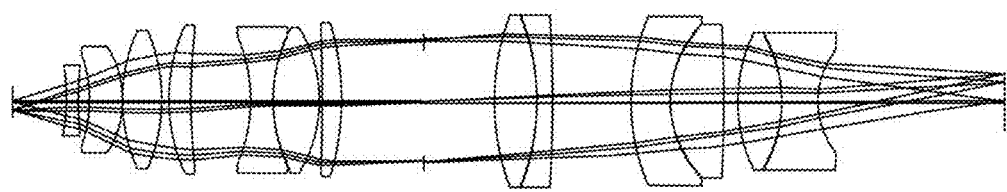
FIG. 6 is a lens diagram of a 2.07× microscope assembly including a 53 mm EFL objective lens and a 110 mm EFL tube lens having NA=0.27 in accordance with an example embodiment.

In another example embodiment that is illustrated schematically at FIG. 6, a 2.07× microscope assembly includes an objective lens assembly and a tube lens assembly that has a numerical aperture NA=0.27 in a configuration where the objective lens assembly has an effective focal length EFL=53 mm and the tube lens assembly has an effective focal length EFL=110 mm.

The example lens assembly for a 2.07× magnification microscope assembly that is illustrated schematically in FIG. 6 exhibits a focal length of 33 mm. The working F/# is 3.7. The maximum image size is 16 mm. The working wavelength range is 470 nm-650 nm. The working distance is 13.5 mm. The resolving power is 1.24 microns.

80/160 Design Prescriptions (Table F2/Table F4)

| Surf | Type | Radius | Thickness | Glass | Clear Diam | Mech Diam |
|---|---|---|---|---|---|---|
| OBJ | STANDARD | Infinity | 31.65637 | | 5.510094 | 5.510094 |
| 1 | STANDARD | −19.01 | 4.5 | S-TIM2 | 20 | 26 |
| 2 | STANDARD | 102.4 | 3 | | 26 | 26 |
| 3 | STANDARD | −183.8 | 7 | S-FPM2 | 32 | 32 |
| 4 | STANDARD | −33.25 | 1 | | 32 | 32 |
| 5 | STANDARD | 85.56 | 7 | S-FPM2 | 38 | 38 |
| 6 | STANDARD | −85.56 | 17.33686 | | 38 | 38 |
| 7 | STANDARD | 296.222 | 7 | S-NPH2 | 42 | 42 |
| 8 | STANDARD | −296.222 | 11.13444 | | 42 | 42 |
| 9 | STANDARD | 395.808 | 4 | S-LAH88 | 42 | 42 |
| 10 | STANDARD | 51.37 | 11.5 | S-FPL53 | 42 | 42 |
| 11 | STANDARD | −51.37 | 20 | | 42 | 42 |
| STO | STANDARD | Infinity | 20 | | 30 | 30 |
| 13 | STANDARD | 77.358 | 10 | S-FPL53 | 40 | 40 |
| 14 | STANDARD | −77.358 | 4 | S-BAL41 | 40 | 40 |
| 15 | STANDARD | 47.7 | 10 | S-FPL53 | 40 | 40 |
| 16 | STANDARD | −195.2 | 22.06346 | | 40 | 40 |
| 17 | STANDARD | 49.15 | 10 | S-BSM16 | 40 | 40 |
| 18 | STANDARD | 211.091 | 13.54012 | | 40 | 40 |
| 19 | STANDARD | 61.2 | 10 | S-BSM16 | 34 | 34 |
| 20 | STANDARD | 24.905 | 78.24066 | | 30 | 34 |
| IMA | STANDARD | Infinity | | | 11.10084 | 11.10084 |

53/110 Design Prescriptions (Table F1/Table F3)

| Surf | Type | Radius | Thickness | Glass | Clear Diam | Mech Diam |
|---|---|---|---|---|---|---|
| OBJ | STANDARD | Infinity | 13.49407 | | 7.589875 | 7.589875 |
| 1 | STANDARD | −46.025 | 3 | S-NPH2 | 15.64348 | 17.44592 |
| 2 | STANDARD | 50.27 | 2.39792 | | 17.44592 | 17.44592 |
| 3 | STANDARD | −31.498 | 8.4 | S-FPL55 | 18.52016 | 26.23722 |
| 4 | STANDARD | −25.424 | 0.2959736 | | 26.23722 | 26.23722 |
| 5 | STANDARD | 43.481 | 9.5 | S-FPL55 | 32.39025 | 34.44294 |
| 6 | STANDARD | −47.054 | 1.770416 | | 34.44294 | 34.44294 |
| 7 | STANDARD | 42.688 | 5.5 | S-NPH2 | 36.56857 | 36.56857 |
| 8 | STANDARD | 216.989 | 15.04568 | | 35.65889 | 36.56857 |
| 9 | STANDARD | Infinity | 22.7394 | | 29.45803 | 29.45803 |
| 10 | COORDBRK | | −22.7394 | | | |
| 11 | STANDARD | −34.431 | 5.5 | S-NBH56 | 30.50982 | 36.00221 |
| 12 | STANDARD | 40.595 | 11.5 | S-FPL55 | 33.01638 | 36.00221 |
| 13 | STANDARD | −34.515 | 0.7394027 | | 36.00221 | 36.00221 |
| 14 | STANDARD | −607.395 | 5 | S-LAH99 | 37.46645 | 38.1159 |
| 15 | STANDARD | −68.737 | 0 | | 38.1159 | 38.1159 |
| 16 | COORDBRK | | 20 | | | |
| STO | STANDARD | Infinity | 20 | | 30 | 30 |
| 18 | STANDARD | 61.639 | 10 | S-FPL53 | 42 | 42 |
| 19 | STANDARD | −65.388 | 4 | S-BSM81 | 42 | 42 |
| 20 | STANDARD | 1664.587 | 19.83505 | | 42 | 42 |
| 21 | STANDARD | 54.07 | 10 | S-LAH66 | 42 | 42 |
| 22 | STANDARD | 27.156 | 13.5 | S-FPL53 | 38 | 38 |
| 23 | STANDARD | −134.035 | 3.282913 | | 38 | 38 |
| 24 | STANDARD | 39.063 | 11 | S-LAH65 | 34 | 34 |
| 25 | STANDARD | −31.15 | 8.6 | S-LAM60 | 34 | 34 |
| 26 | STANDARD | 20.699 | 46.94229 | | 26 | 34 |
| IMA | STANDARD | Infinity | | | 16.00341 | 16.00341 |

Figure 7:
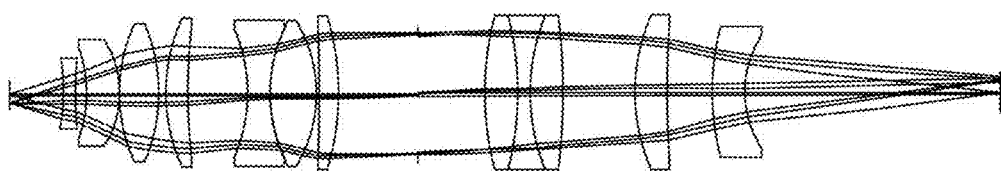
FIG. 7 is a lens diagram of a 3× microscope assembly including a 53 mm EFL objective lens and a 160 mm EFL tube lens having NA=0.27 in accordance with an example embodiment.

In another example embodiment that is illustrated schematically at FIG. 7, a 3× microscope assembly includes an objective lens assembly and a tube lens assembly that has a numerical aperture NA=0.27 in a configuration where the objective lens assembly has an effective focal length EFL=53 mm and the tube lens assembly has an effective focal length EFL=160 mm.

Figure 8:
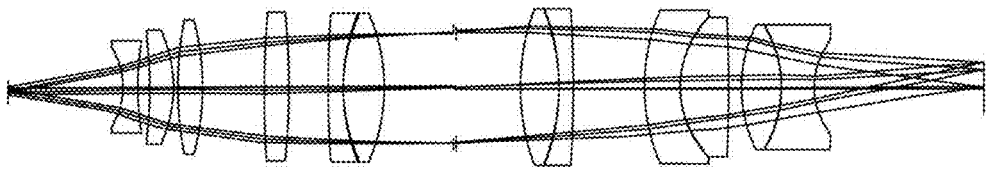
FIG. 8 is a lens diagram of a 1.375× microscope assembly including an 80 mm EFL objective lens and a 110 mm EFL tube lens having NA=0.18 in accordance with an example embodiment.

In another example embodiment that is illustrated schematically at FIG. 8, a 1.375× microscope assembly includes an objective lens assembly and a tube lens assembly that has a numerical aperture NA=0.18 in a configuration where the objective lens assembly has an effective focal length EFL=80 mm and the tube lens assembly has an effective focal length EFL=110 mm.

Figure 9:
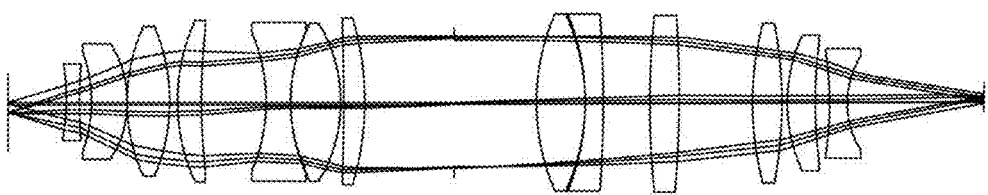
FIG. 9 is a lens diagram of a 1.5× microscope assembly including a 53 mm EFL objective lens and a 80 mm EFL tube lens having NA=0.27 in accordance with an example embodiment.

In another example embodiment that is illustrated schematically at FIG. 9, a 1.5× microscope assembly includes an objective lens assembly and a tube lens assembly that has a numerical aperture NA=0.27 in a configuration where the objective lens assembly has an effective focal length EFL=53 mm and the tube lens assembly has an effective focal length EFL=80 mm.

Figure 10:
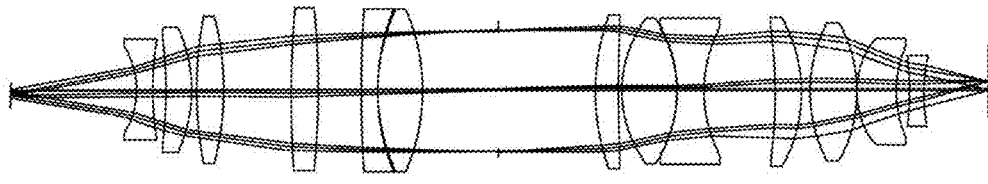
FIG. 10 is a lens diagram of a 0.66× microscope assembly including an 80 mm EFL objective lens and a 53 mm EFL tube lens having NA=0.18 in accordance with an example embodiment.

In another example embodiment that is illustrated schematically at FIG. 10, a 0.66× microscope assembly includes an objective lens assembly and a tube lens assembly that has a numerical aperture NA=0.18 in a configuration where the objective lens assembly has an effective focal length EFL=80 mm and the tube lens assembly has an effective focal length EFL=53 mm.

Figure 11:
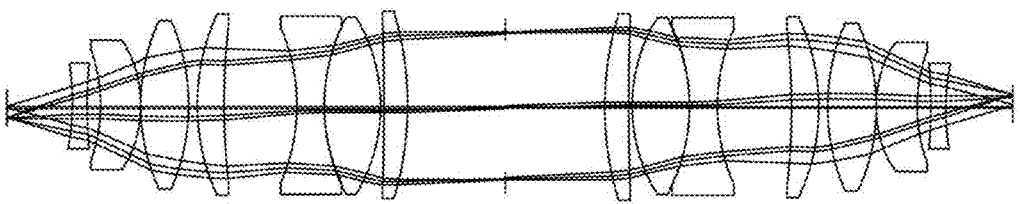
FIG. 11 is a lens diagram of a 1× microscope assembly including a 53 mm EFL objective lens and a 53 mm EFL tube lens having NA=0.27 in accordance with an example embodiment.

In another example embodiment that is illustrated schematically at FIG. 11, a 1× microscope assembly includes an objective lens assembly and a tube lens assembly that has a numerical aperture NA=0.27 in a configuration where the objective lens assembly has an effective focal length EFL=53 mm and the tube lens assembly has an effective focal length EFL=53 mm.

Figure 12:
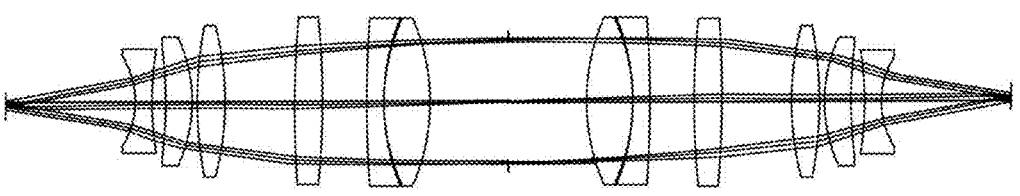
FIG. 12 is a lens diagram of a 1× microscope assembly including an 80 mm EFL objective lens and a 80 mm EFL tube lens having NA=0.18 in accordance with an example embodiment.

In another example embodiment that is illustrated schematically at FIG. 12, a 1× magnification microscope assembly is provided that includes an objective lens assembly and a tube lens assembly that has a numerical aperture NA=0.18 in a configuration where the objective lens assembly has an effective focal length EFL=80 mm and the tube lens assembly has an effective focal length EFL=80 mm.

Figure 13:
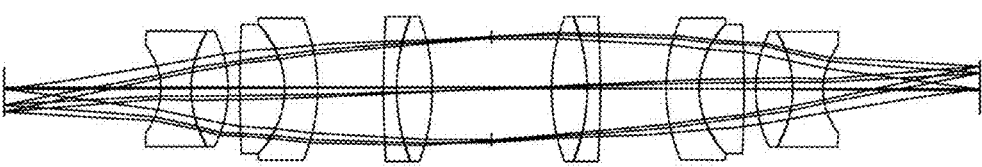
FIG. 13 is a lens diagram of a 1× microscope assembly including a 110 mm EFL objective lens and a 110 mm EFL tube lens having NA=0.14 in accordance with an example embodiment.

In another example embodiment that is illustrated schematically at FIG. 13, a 1× microscope assembly includes an objective lens assembly and a tube lens assembly that has a numerical aperture NA=0.14 in a configuration where the objective lens assembly has an effective focal length EFL=110 mm and the tube lens assembly has an effective focal length EFL=110 mm.

Figure 14:
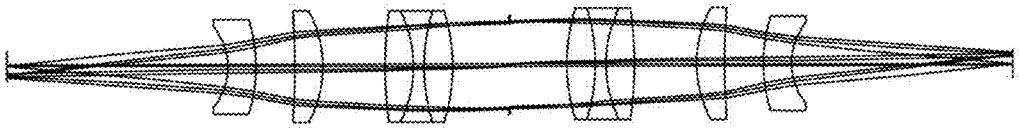
FIG. 14 is a lens diagram of a 1× microscope assembly including an 160 mm EFL objective lens and a 160 mm EFL tube lens having NA=0.094 in accordance with an example embodiment.

In another example embodiment that is illustrated schematically at FIG. 14, a 1× microscope assembly includes an objective lens assembly and a tube lens assembly that has a numerical aperture NA=0.094 in a configuration where the objective lens assembly has an effective focal length EFL=160 mm and the tube lens assembly has an effective focal length EFL=160 mm.

Figure 15:
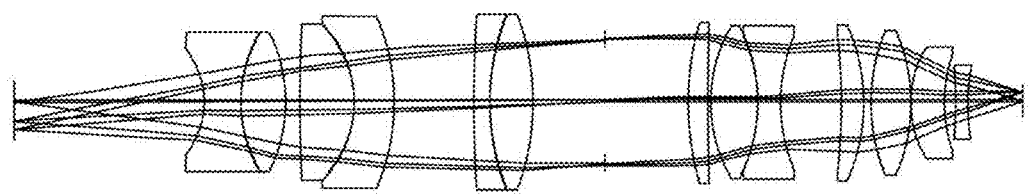
FIG. 15 is a lens diagram of a 0.5× microscope assembly including a 110 mm EFL objective lens and a 53 mm EFL tube lens having NA=0.14 in accordance with an example embodiment.

In another example embodiment that is illustrated schematically at FIG. 15, a 0.5× microscope assembly includes an objective lens assembly and a tube lens assembly that has a numerical aperture NA=0.14 in a configuration where the objective lens assembly has an effective focal length EFL=110 mm and the tube lens assembly has an effective focal length EFL=53 mm.

Figure 16:
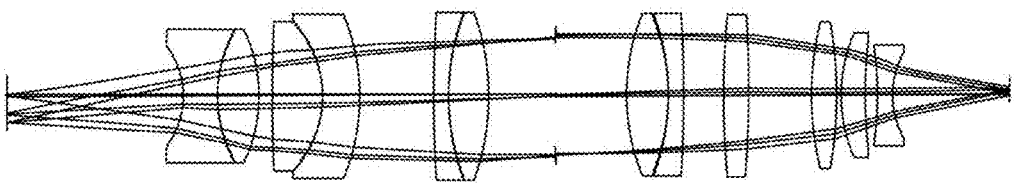
FIG. 16 is a lens diagram of a 0.727× microscope assembly including a 110 mm EFL objective lens and a 80 mm EFL tube lens having NA=0.14 in accordance with an example embodiment.

In another example embodiment that is illustrated schematically at FIG. 16, a 0.75× microscope assembly includes an objective lens assembly and a tube lens assembly that has a numerical aperture NA=0.14 in a configuration where the objective lens assembly has an effective focal length EFL=110 mm and the tube lens assembly has an effective focal length EFL=80 mm.

Figure 17:
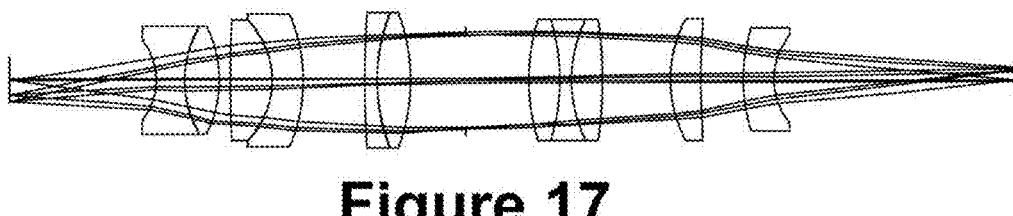
FIG. 17 is a lens diagram of a 1.45× microscope assembly including a 110 mm EFL objective lens and a 160 mm EFL tube lens having NA=0.14 in accordance with an example embodiment.

In another example embodiment that is illustrated schematically at FIG. 17, a 1.45× microscope assembly includes an objective lens assembly and a tube lens assembly that has a numerical aperture NA=0.14 in a configuration where the objective lens assembly has an effective focal length EFL=110 mm and the tube lens assembly has an effective focal length EFL=160 mm.

Figure 18:
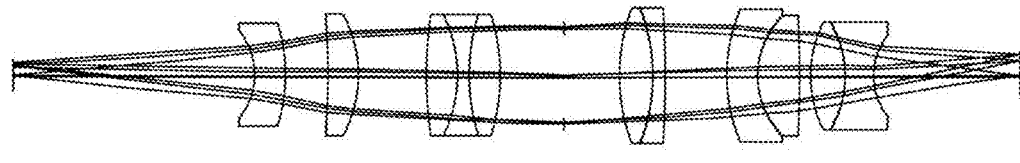
FIG. 18 is a lens diagram of a 0.6875× microscope assembly including a 160 mm EFL objective lens and a 110 mm EFL tube lens having NA=0.094 in accordance with an example embodiment.

In another example embodiment that is illustrated schematically at FIG. 18, a 0.6875× microscope assembly includes an objective lens assembly and a tube lens assembly that has a numerical aperture NA=0.094 in a configuration where the objective lens assembly has an effective focal length EFL=160 mm and the tube lens assembly has an effective focal length EFL=110 mm.

Figure 19:
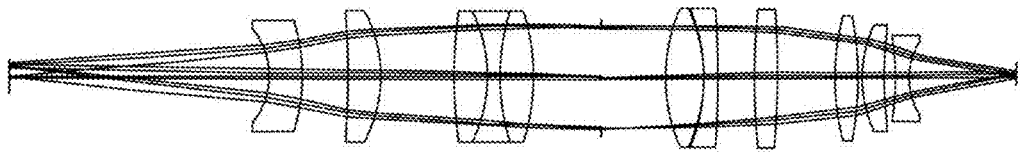
FIG. 19 is a lens diagram of a 0.5× microscope assembly including a 160 mm EFL objective lens and a 80 mm EFL tube lens having NA=0.094 in accordance with an example embodiment.

In another example embodiment that is illustrated schematically at FIG. 19, a 0.5× microscope assembly includes an objective lens assembly and a tube lens assembly that has a numerical aperture NA=0.094 in a configuration where the objective lens assembly has an effective focal length EFL=160 mm and the tube lens assembly has an effective focal length EFL=80 mm.

Figure 20:
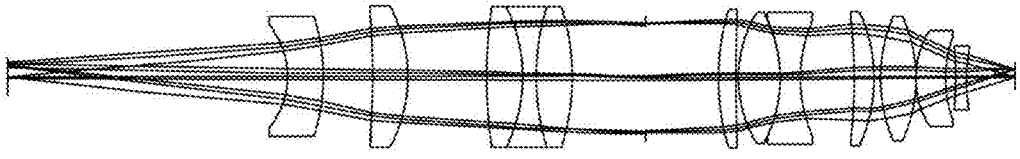
FIG. 20 is a lens diagram of a 0.34× microscope assembly including an 160 mm EFL objective lens and a 53 mm EFL tube lens having NA=0.094 in accordance with an example embodiment.
Figure 21:
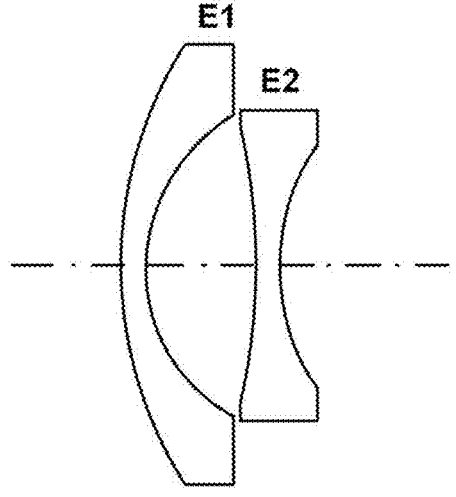
FIGS. 21-27 are lens diagrams of example wide field of view lens attachments in accordance with example embodiments.
Figure 22:
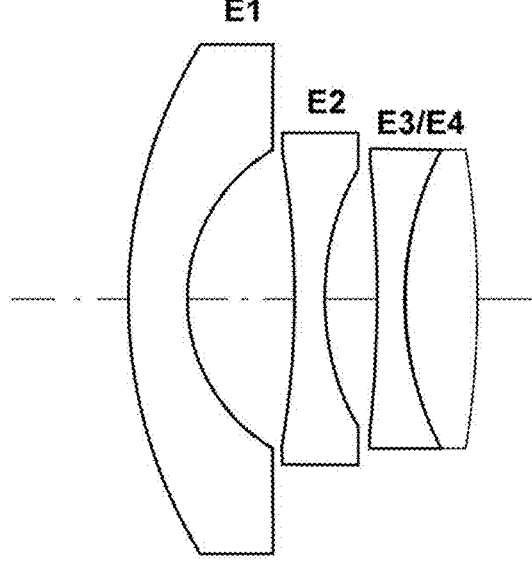
Figure 23:
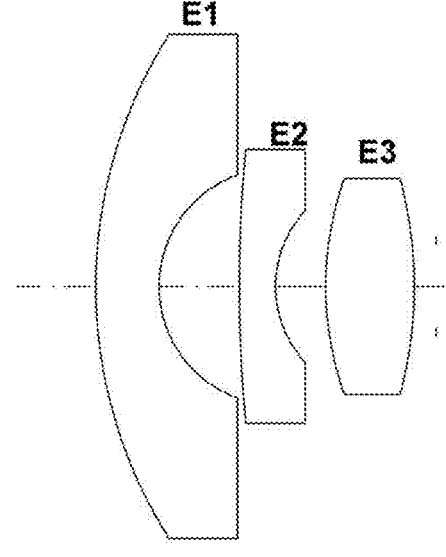
Figure 24:
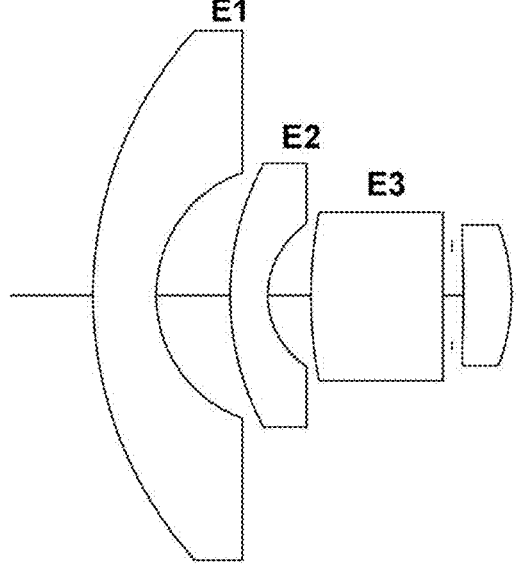
Figure 25:
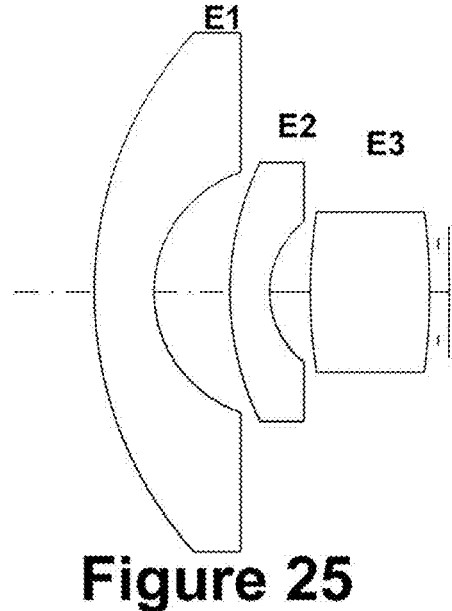
Figure 26:
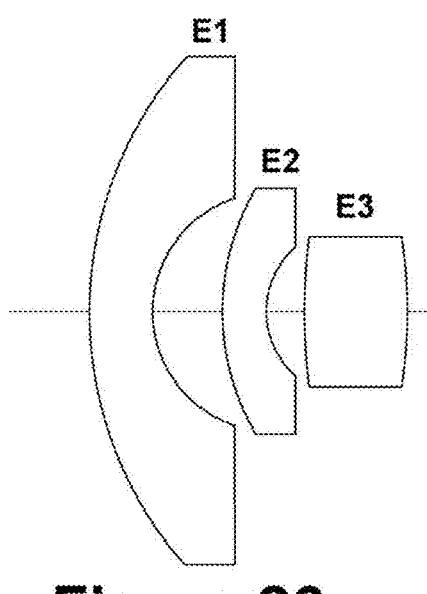
Figure 27:
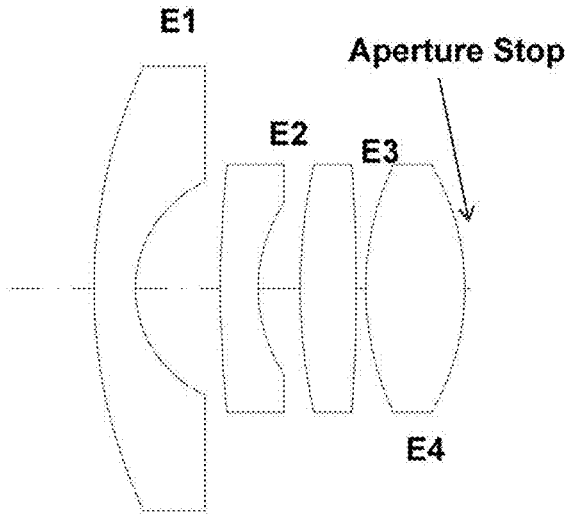

In another example embodiment that is illustrated schematically at FIG. 20, a 0.34× microscope assembly includes an objective lens assembly and a tube lens assembly that has a numerical aperture NA=0.094 in a configuration where the objective lens assembly has an effective focal length EFL=160 mm and the tube lens assembly has an effective focal length EFL=53 mm.

Numerical Aperture

Numerical apertures (NA) of the four individual lens assemblies are as follows:

53 mm: NA=0.27,
80 mm: NA=0.18,
110 mm: NA=0.14, and
160 mm: NA=0.094.

The NA of the objective component of a configuration determines the NA of the combination objective-tube lens assembly. For example, NA of configuration 80/160 (2×) is 0.18,
NA of 53/110 (2.07×) is 0.27,
NA of 80/110 (1.375×) is 0.18, and
NA of 110/160 (1.45×) is 0.14.

Magnification

The magnifications of these example objective lens-tube lens assemblies range between 3× and 0.34×. The magnifications in parenthesis of the sixteen example embodiments described in detail herein are as follows:

for 53 mm/160 mm (3×),
for 53 mm/110 mm (2.075×),
for 80 mm/160 mm (2×),
for 53 mm/80 mm (1.51×),
for 110 mm/160 mm (1.45×),
for 80 mm/110 mm (1.375×),
for the four symmetric configurations (1×),
for 110 mm/80 mm (0.727×),
for 160 mm/110 mm (0.6875×),
for 80 mm/53 mm (0.6625×),
for 160 mm/80 mm (0.5×),
for 110 mm/53 mm (0.48×),
for 160 mm/53 mm (0.34×),

Wider Field of View

FIGS. 21-27 are lens diagrams of example wide field of view lens attachments in accordance with example embodiments. The optical prescriptions for the lens assemblies that are illustrated schematically in FIGS. 21-27 are provided at Tables F21-F27 below.

TABLE F21

|  | RDY | THI | GLA |
|---|---|---|---|
| OBJ | INFINITY | 5000.000000 | |
| 1 | 32.325 | 1.8 | 882997.407651 |
| 2 | 13.4 | 8.175409 | |
| 3 | −51.8 | 1.8 | 496999.815459 |
| 4 | 16.95 | 27.5 | |

TABLE F22

| RDY | RDY | THI | GLA |
|---|---|---|---|
| OBJ | INFINITY | 5000.000000 | |
| 1 | 21.175 | 2.75 | 882997.407651 |
| 2 | 7.6 | 5.105 | |
| 3 | -37 | 1.4 | 496999.815459 |
| 4 | 11.5 | 2.413 | |
| 5 | -54.6 | 1.4 | 496999.815459 |
| 6 | 14.85 | 3.4 | 737999.322613 |
| 7 | -37.425 | 2.92 | |

TABLE F23

| | RDY | THI | GLA |
|---|---|---|---|
| OBJ | INFINITY | 2500.000000 | |
| 1 | 13.1 | 1.75 | 800999.349787 |
| 2 | 3.3 | 2.219 | |
| 3 | 40 | 1 | 496998.815947 |
| 4 | 3.1 | 1.39 | |
| 5 | 9 | 2.45 | 846670.237912 |
| 6 | -11.635 | 0.606 | |

TABLE F24

| | RDY | THI | GLA |
|---|---|---|---|
| OBJ | INFINITY | 2500.000000 | |
| 1 | 10.25 | 1.5 | 729157.546800 |
| 2 | 3.15 | 1.802 | |
| 3 | 6.25 | 1 | 729157.546800 |
| 4 | 2.24 | 1.029 | |
| 5 | 11.235 | 3.22 | 808095.227608 |
| 6 | INFINITY | 0.25 | |

TABLE F25

| | RDY | THI | GLA |
|---|---|---|---|
| OBJ | INFINITY | 2500.000000 | |
| 1 | 9.835 | 1.5 | 729157.546800 |
| 2 | 3.2 | 1.915 | |
| 3 | 7.46 | 1 | 618000.633335 |
| 4 | 2.22 | 1.028 | |
| 5 | 13.51456 | 3 | 808095.227608 |
| 6 | -15.50477 | 0.2115 | |

TABLE F26

| | RDY | THI | GLA |
|---|---|---|---|
| OBJ | INFINITY | INFINITY | |
| 1 | 9.75 | 1.6 | 729157.546800 |
| 2 | 3.05 | 1.77 | |
| 3 | 6.3 | 1.1 | 729157.546800 |
| 4 | 2.2 | 0.9682 | |
| 5 | 16.285 | 2.617 | 922860.188969 |
| 6 | -15.335 | 0.256 | |

TABLE F27

| | RDY | THI | GLA |
|---|---|---|---|
| OBJ | INFINITY | 2500 | |
| 1 | 14.375 | 1.1 | 772495.495905 |
| 2 | 3.18 | 2.25 | |
| 3 | 32.5 | 1 | 617998.634167 |
| 4 | 4.25 | 1.114 | |

TABLE F27-continued

| | RDY | THI | GLA |
|---|---|---|---|
| 5 | 15.65 | 1.485 | 922867.188955 |
| 6 | -45.75 | 0.25 | |
| 7 | 8 | 2.625 | 772495.495905 |
| 8 | -6.75 | 0.255 | |

Illuminator

Figure 28:
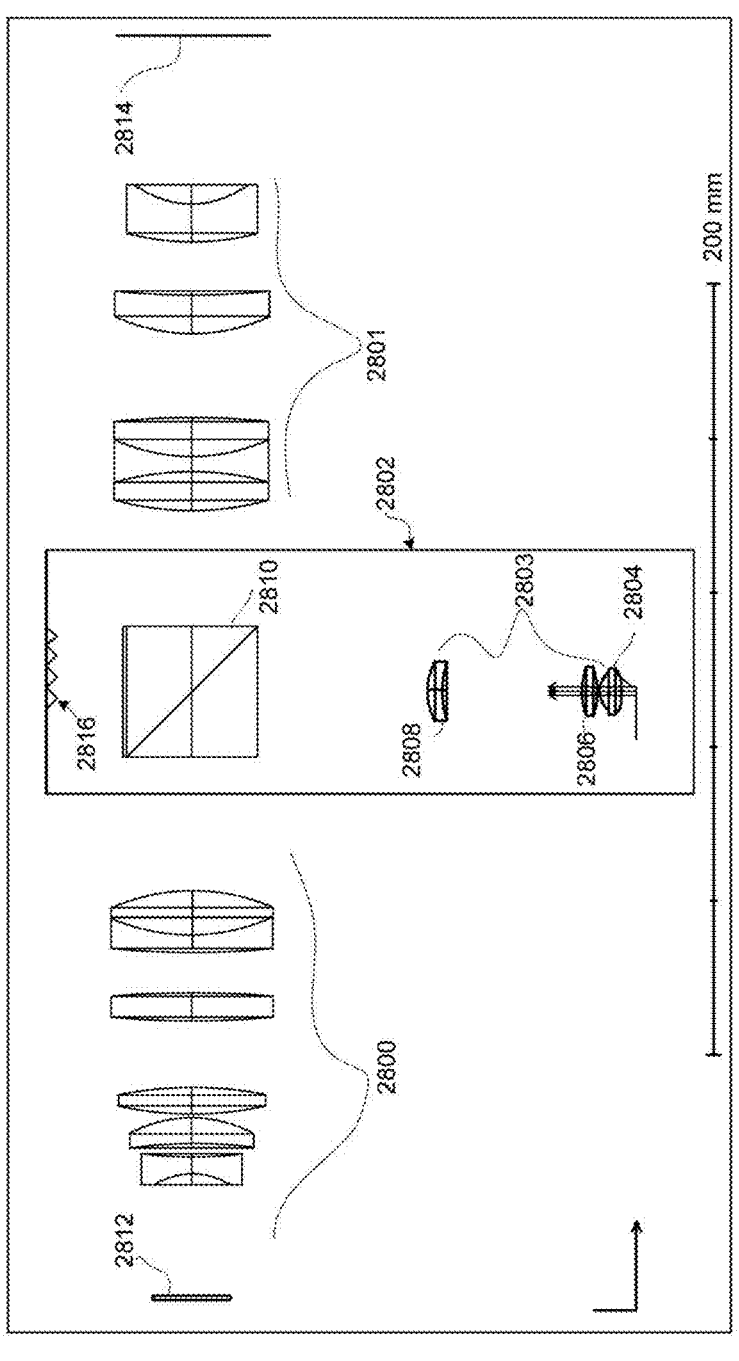
FIG. 28 is a lens diagram of an illuminator lens assembly in accordance with an example embodiment.

An optical system in accordance with an example embodiment may include a microscope, with an objective lens assembly 2800 and a tube lens assembly 2801, and an illuminator assembly 2802 as illustrated schematically in FIG. 28. The illuminator assembly 2802 may include a light source (not shown), an illuminator lens assembly 2803 and a beam splitter 2810. An illuminator lens assembly 2803 in accordance with an example embodiment may include, from nearest to the light source, a condenser Lens 2804, e.g., a plastic aspheric Lens, a biconvex lens 2806, and a meniscus lens 2808. A filter can be optionally added.

A cube may work as a beam splitter 2810 (50/50 or other ratios). A plate beam splitter can substitute for the cube shown in FIG. 28.

In an example embodiment, an illuminator lens assembly 2803 may transmit light from a light source onto a beam splitter 2810. The illuminator lens assembly 2803 may include a condenser lens 2804, a biconvex lens 2806 and a meniscus lens 2808. Light reflected from the beam splitter 2810 may be transmitted through the objective lens 2801 to illuminate an object 2812. The illuminator light reflected from the beam splitter 2810 may transmit both the objective lens 2801 and a wide field of view lens attachment in certain example embodiments before illuminating the object 2812. The signal light from the object 2812 goes through the objective assembly 2801, or both a lens attachment and the objective assembly 2801 in certain example embodiments, as well as the beam splitter 2810 and the tube lens assembly 2800 to form an image on an image sensor 2814. The image sensor 2814 may be an image sensor in a range between a ⅔" image sensor and a ⅓" image sensor, including 1", 1.1" and 1.2" image sensors.

In an example embodiment wherein a 50/50 beam splitter 2810 is used, 50% of illumination light will be redirected into the objective assembly 2801 to illuminate the object 2812, while another 50% of illumination light will transmit through the top surface of cube 2810 to hit metalworks 2816 behind the cube 2810 and is not used in image formation. The metalworks 2816 may be formed from anodized aluminium, Al, or aluminum, and may be configured so as not to reflect incident light which may otherwise become stray light capable of reaching the image sensor 2814. The signal light from the object 2812 also loses 50% of its intensity when it transmits the beam splitter 2810 to reach the image sensor 2814.

The illuminator assembly 2802 is advantageously designed so that stray light is minimized in the optical system and good uniformity of illuminating light is achieved. Stray light contributions are further suppressed in the lens assembly design process by minimizing the number and location of near normal incidence surfaces.

Figure 29:
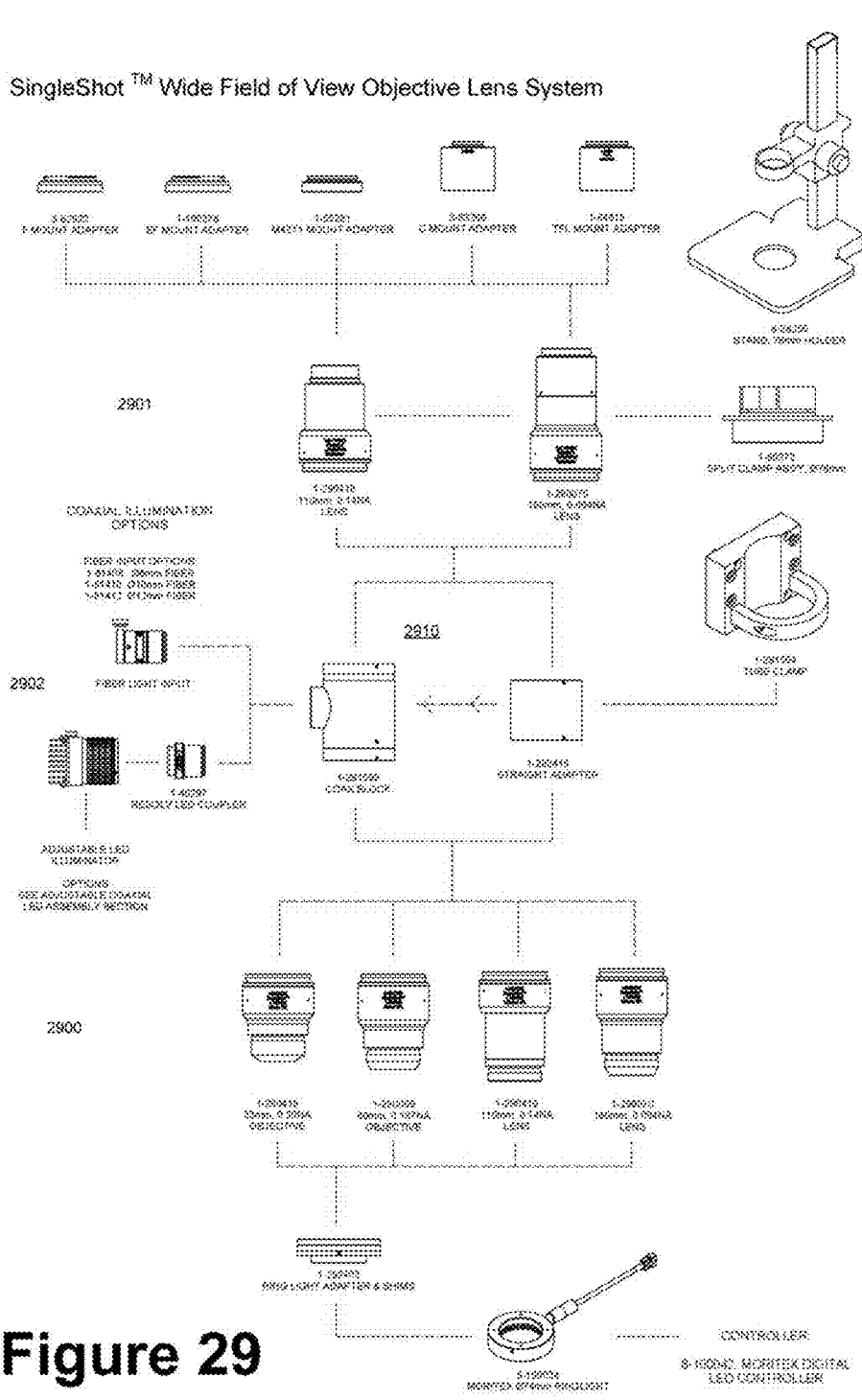
FIG. 29 schematically illustrates several components of a microscope assembly kit in accordance with an example embodiment.

FIG. 29 schematically illustrates a microscope assembly including optional and alternative components in accordance with example embodiments.

Figure 30:
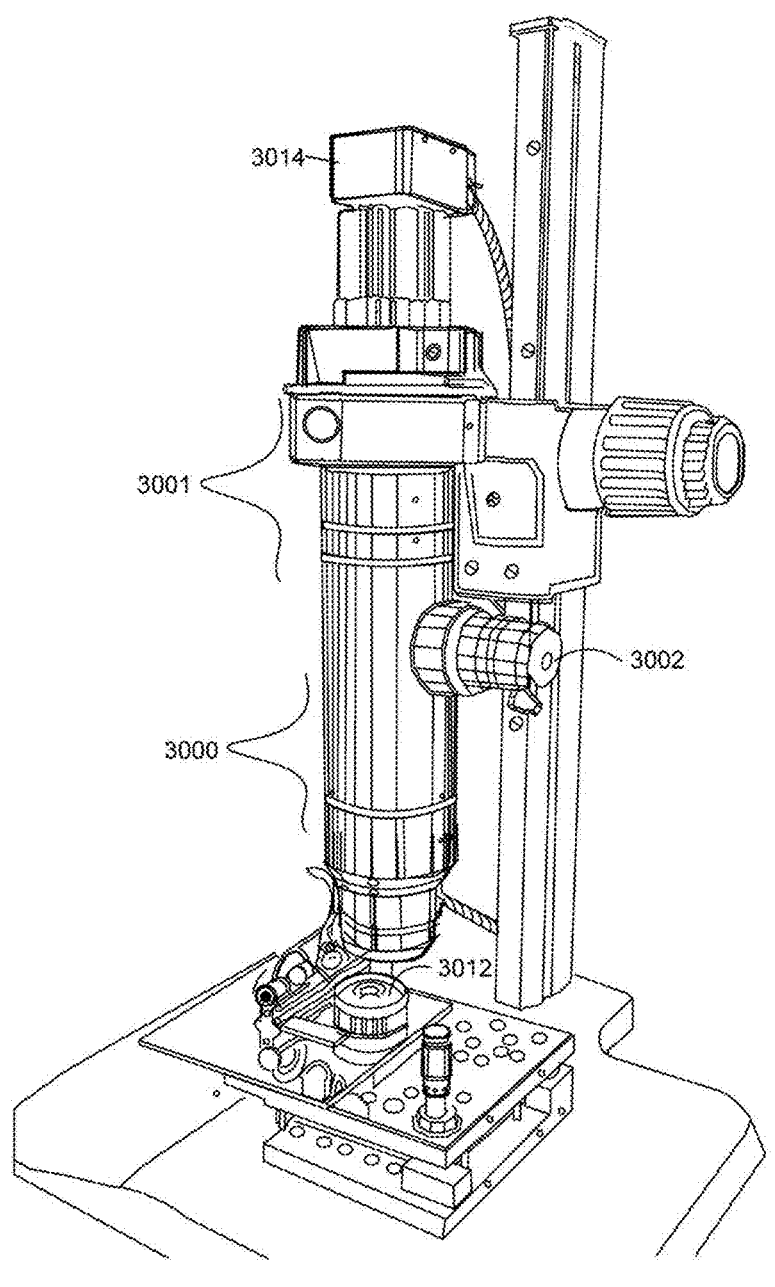
FIG. 30 is a perspective view of a microscope assembly housing in accordance with an example embodiment.

FIG. 30 is a perspective view of a microscope assembly housing in accordance with an example embodiment.

FIG. 31 is a table that includes certain configuration specifications for the example lens assemblies that are illustrated schematically at FIGS. 1-20.

FIG. 32 is a table that includes certain information regarding the example lens assemblies that are illustrated schematically at FIGS. 1-20.

Figure 33:
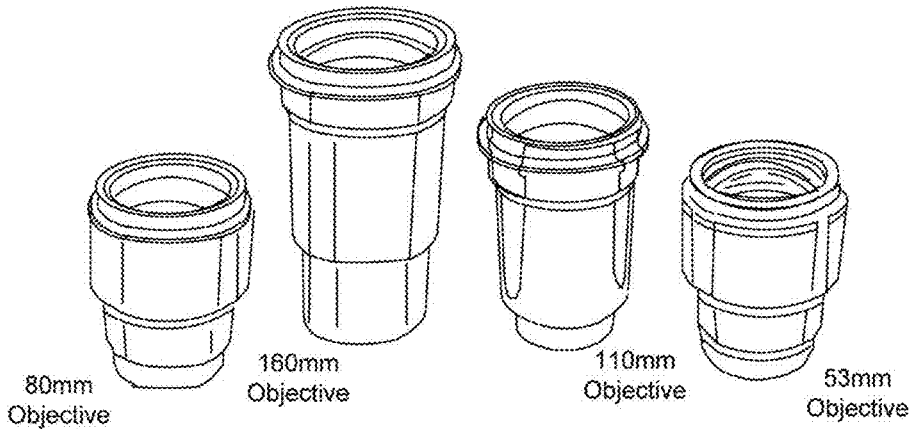
FIG. 33 illustrates the four lenses of FIGS. 1-4 in an example packaging embodiment.

FIG. 33 illustrates the four lenses of FIGS. 1-4 in an example packaging embodiment.

Performance

With regard to performance, there are four distances, which are effective focal length (efl) distances of four example embodiments of lens objectives and four example efl distances of rear adapters or tube lenses. The efl distances of these example embodiments include 53 mm, 80 mm, 110 mm, and 160 mm. With these four example embodiments of both microscope components, sixteen pairs of objective lens-tube lens pairs have been formed and are provided.

Performance data is provided for eight of these sixteen pairs in the priority provisional patent application 63/236, 233 which is incorporated by reference. Objectives of each of the four example efl distances each combined with both 110 mm and 160 mm tube lenses are included in the performance data. These combinations have been written as 53 mm+110 mm, 53 mm+160 mm, 80 mm+110 mm, 80 mm+160 mm, 110 mm+110 mm, 110 mm+160 mm, 160 mm+110 mm, 160 mm+160 mm. The first number is the efl for the objective component of the lens assembly, which is disposed on the object side of an aperture stop, while the second number is the efl for the tube lens or rear adapter component of the lens assembly, which is disposed on the image side of the aperture stop.

For each of these eight example objective-tube lens pairs, twenty-six (26) performance graphics sheets are included in the drawings provided in the priority provisional patent application Ser. No. 63/236,233 which is incorporated by reference. These include six performance graphics sheets for a ⅔" field curvature configuration, and five performance graphics sheets for one 1" field curvature configuration, two 1.1" field curvature configurations, and one 1.2" field curvature configuration.

Many modifications of the described example embodiments are possible. Such modifications may produce lens assemblies with different characteristics, capabilities and/or parameter values or ranges. Such modified lens assemblies may still be within the scope of the invention expressly set forth in one or more claims, or structural or functional equivalents thereof.

In another example embodiment, a microscope assembly kit may include lens assemblies with, respectively, effective focal lengths of 53 mm, 80 mm, 110 mm, and 160 mm, and numerical apertures of 0.27, 0.18, 0.14 and 0.094. In this example embodiment, one or more conventional tube lens assemblies are also included with the kit, e.g., having effective focal lengths of 180 mm and/or 200 mm. Objective-tube lens combinations in accordance with such further example microscope assembly kits may include 53 mm, 80 mm, 110 mm and/or 160 mm objectives combined with 180 mm and/or 200 mm conventional tube lenses to form eight additional microscope assemblies, including a 3.4× microscope having NA=0.27, a 2.25× microscope having NA=0.18, a 1.64× microscope having NA=0.14, and a 1.135× microscope having NA=0.094, as well as a 3.77× microscope having NA=0.27, a 2.5× microscope having NA=0.18, a 1.8× microscope having NA=0.14, and a 1.25× microscope having NA=0.094.

In another example embodiment, a 2× microscope assembly includes an objective lens assembly and a tube lens assembly that has a numerical aperture larger than NA=0.27 in a configuration where the objective lens assembly has an effective focal length EFL=40 mm and the tube lens assembly has an effective focal length EFL=80 mm.

In another example embodiment, a 2.12× microscope assembly includes an objective lens assembly and a tube lens assembly that has a numerical aperture larger than NA=0.27 in a configuration where the objective lens assembly has an effective focal length EFL=25 mm and the tube lens assembly has an effective focal length EFL=53 mm.

In another example embodiment, a 2.75× microscope assembly includes an objective lens assembly and a tube lens assembly that has a numerical aperture larger than NA=0.27 in a configuration where the objective lens assembly has an effective focal length EFL=40 mm and the tube lens assembly has an effective focal length EFL=110 mm.

In another example embodiment, a 4.4× microscope assembly includes an objective lens assembly and a tube lens assembly that has a numerical aperture larger than NA=0.27 in a configuration where the objective lens assembly has an effective focal length EFL=25 mm and the tube lens assembly has an effective focal length EFL=110 mm.

A field of view may be widened on one or both ends of an objective-tube lens assembly in an example embodiment. A combination of meniscus lenses alone or in combination with one or two convex lenses, such as any of those described at U.S. Pat. Nos. 9,726,859, 10,921,566 and/or 10,908,396 which are incorporated by reference, may be coupled at an object end of an objective-tube lens assembly as a lens attachment module in order to achieve a field of view exceeding 120°, 135° or 150° or more.

An objective-tube lens assembly may be configured to have partially-overlapping fields of view in order to achieve some sense of distances to objects within the overlapped portion of the two fields of view. The overlapping fields of view can be achieved in a variety of example embodiments.

In one example, the optical axis of a light collection lens attachment module may form an obtuse angle offset from collinear with the optical axis of the objective-tube lens assembly module to which the light collection lens attachment module may be coupled A mirror may be used to collect light with a lens attachment module having an optical axis offset from collinear with the optical axis of an objective-tube lens assembly to which such lens attachment module may be coupled.

In an example wherein the lens attachment module having an optical axis offset by 60° from that of the objective-tube lens assembly module is configured to collect light with a field of view of 150°, then the lens attachment module would have a field of view that crosses the normal to the optical axis of the objective-tube lens assembly module by 35°. A second lens attachment module with a field of view of 150° may be coupled to the other side of the objective-tube lens assembly module having its optical axis collinear with that of the objective-tube lens assembly module. In this example, the two ends of the objective-tube lens assembly module have fields of view that overlap by 20°, enabling depth perception and distance determination for objects disposed within the overlapping portion of the fields of view.

In another example embodiment, the optical axis offset of both ends of an objective-tube lens assembly module is 90°. These two ends of this example objective-tube lens assembly module are configured to collect light in parallel. In this example, neither end is required to have a particularly wide field of view in order to have overlapping fields of view for depth perception and distance determinations and 3D imaging.

In another example, the optical axis of one or both of the objective lens component and the tube lens component of an objective-tube lens assembly may form an obtuse angle offset from collinear with the optical axis of the other component and/or of an optical axis along which an image sensor is disposed. A mirror may be used to collect light with the objective component having an optical axis offset from collinear with the optical axis of the tube lens component.

In another example embodiment, an objective-tube lens assembly module may be disposed on a swivel-mount. Either or both ends of the objective-tube lens assembly module may be disposed to collect light with the direction of its optical axis adjusted towards a peripherally-disposed object for a period of time after which the direction of swivel may be reversed such that the other end of the objective-tube lens assembly becomes capable of imaging the same peripherally-disposed object for another period of time. By combining images of the object viewed from the two ends of the objective-tube lens assembly module, including offsetting temporally the image capture timing of the two ends, 3D images may be constructed from the sets of 2D image data taken from the two ends wherever there has been an overlapping field of view created by the back and forth swiveling of the otherwise linear objective-tube lens assembly module.

U.S. Pat. Nos. 9,835,835, 10,901,189 and 10,914,928 are also incorporated by reference as disclosing component optical modules that may be included in additional example embodiments with modifications designed to induce characteristic, capability and/or parameter value or range differences.

We claim:

1. A microscope assembly kit, comprising:
(a) multiple diffraction limited lens assemblies each having an unique combination among said lens assemblies of effective focal length and numerical aperture;
(b) a microscope housing configured to contain combinations of said lens assemblies each forming a microscope assembly that includes an objective lens and a tube lens disposed on object and image sides, respectively, of an aperture stop;
(c) wherein said microscope assembly is configured to form images with both (i) a numerical aperture equal to the numerical aperture of the objective lens, and (ii) a magnification equal to a ratio of effective focal lengths of the tube lens and the objective lens;
(d) wherein the microscope assembly kit comprises one or more combinations of said lens assemblies each forming said microscope assembly with a numerical aperture above 0.1 and a magnification of 2× or more.

2. The microscope assembly kit of claim 1, comprising a wide field of view lens attachment lens assembly that includes two meniscus lenses.

3. The microscope assembly kit of claim 2, wherein the wide field of view lens attachment lens assembly further includes a biconvex lens.

4. The microscope assembly kit of claim 2, wherein the wide field of view lens attachment lens assembly further includes two biconvex lenses.

5. A microscope assembly kit, comprising:
(e) multiple diffraction limited lens assemblies each having an unique combination among said lens assemblies of effective focal length and numerical aperture;
(f) a microscope housing configured to contain combinations of said lens assemblies each forming a microscope assembly that includes an objective lens and a tube lens disposed on object and image sides, respectively, of an aperture stop;
(g) wherein said microscope assembly is configured to form images with both (i) a numerical aperture equal to the numerical aperture of the objective lens, and (ii) a magnification equal to a ratio of effective focal lengths of the tube lens and the objective lens;
(h) wherein the microscope assembly kit comprises two or more combinations of said lens assemblies each forming said microscope assembly with a numerical aperture above 0.1 and a magnification of 2× or more.

6. A microscope assembly kit, comprising:
(i) multiple diffraction limited lens assemblies each having an unique combination among said lens assemblies of effective focal length and numerical aperture;
(j) a microscope housing configured to contain combinations of said lens assemblies each forming a microscope assembly that includes an objective lens and a tube lens disposed on object and image sides, respectively, of an aperture stop;
(k) wherein said microscope assembly is configured to form images with both (i) a numerical aperture equal to the numerical aperture of the objective lens, and (ii) a magnification equal to a ratio of effective focal lengths of the tube lens and the objective lens;
(l) wherein the microscope assembly kit comprises one or more combinations of said lens assemblies each forming said microscope assembly with a numerical aperture above 0.14 and a magnification of 2× or more.

7. The microscope assembly kit of claim 6, comprising a wide field of view lens attachment lens assembly that includes two meniscus lenses.

8. The microscope assembly kit of claim 7, wherein the wide field of view lens attachment lens assembly further includes a biconvex lens.

9. The microscope assembly kit of claim 8, wherein the wide field of view lens attachment lens assembly further includes two biconvex lenses.

10. A microscope assembly kit, comprising:
(m) multiple diffraction limited lens assemblies each having an unique combination among said lens assemblies of effective focal length and numerical aperture;
(n) a microscope housing configured to contain combinations of said lens assemblies each forming a microscope assembly that includes an objective lens and a tube lens disposed on object and image sides, respectively, of an aperture stop;
(o) wherein said microscope assembly is configured to form images with both (i) a numerical aperture equal to the numerical aperture of the objective lens, and (ii) a magnification equal to a ratio of effective focal lengths of the tube lens and the objective lens;
(p) wherein the microscope assembly kit comprises two or more combinations of said lens assemblies each forming said microscope assembly with a numerical aperture above 0.14 and a magnification of 2× or more.

11. The microscope assembly kit of claim 10, comprising a wide field of view lens attachment lens assembly that includes two meniscus lenses.

12. The microscope assembly kit of claim 11, wherein the wide field of view lens attachment lens assembly further includes a biconvex lens.

13. The microscope assembly kit of claim 11, wherein the wide field of view lens attachment lens assembly further includes two biconvex lenses.

14. The microscope assembly kit of claim 13, wherein the wide field of view lens attachment lens assembly further includes a biconvex lens.

15. The microscope assembly kit of claim 13, wherein the wide field of view lens attachment lens assembly further includes two biconvex lenses.

16. A microscope assembly kit, comprising:
(q) multiple diffraction limited lens assemblies each having an unique combination among said lens assemblies of effective focal length and numerical aperture;
(r) a microscope housing configured to contain combinations of said lens assemblies each forming a microscope assembly that includes an objective lens and a tube lens disposed on object and image sides, respectively, of an aperture stop;
(s) wherein said microscope assembly is configured to form images with both (i) a numerical aperture equal to the numerical aperture of the objective lens, and (ii) a magnification equal to a ratio of effective focal lengths of the tube lens and the objective lens;
(t) wherein the microscope assembly kit comprises one or more combinations of said lens assemblies each forming said microscope assembly with a numerical aperture not less than 0.18 and a magnification of 2× or more.

17. The microscope assembly kit of claim 16, comprising a wide field of view lens attachment lens assembly that includes two meniscus lenses.

18. A microscope assembly kit, comprising:
(u) multiple diffraction limited lens assemblies each having an unique combination among said lens assemblies of effective focal length and numerical aperture;
(v) a microscope housing configured to contain combinations of said lens assemblies each forming a microscope assembly that includes an objective lens and a tube lens disposed on object and image sides, respectively, of an aperture stop;
(w) wherein said microscope assembly is configured to form images with both (i) a numerical aperture equal to the numerical aperture of the objective lens, and (ii) a magnification equal to a ratio of effective focal lengths of the tube lens and the objective lens;
(x) wherein the microscope assembly kit comprises two or more combinations of said lens assemblies each forming said microscope assembly with a numerical aperture not less than 0.18 and a magnification of 2× or more.

19. A microscope assembly kit, comprising:
(y) multiple diffraction limited lens assemblies each having an unique combination among said lens assemblies of effective focal length and numerical aperture;
(z) a microscope housing configured to contain combinations of said lens assemblies each forming a microscope assembly that includes an objective lens and a tube lens disposed on object and image sides, respectively, of an aperture stop;
(aa) wherein said microscope assembly is configured to form images with both (i) a numerical aperture equal to the numerical aperture of the objective lens, and (ii) a magnification equal to a ratio of effective focal lengths of the tube lens and the objective lens;
(bb) wherein the microscope assembly kit comprises at least one 3× magnification lens assembly with a numerical aperture not less than 0.18.

20. The microscope assembly kit of claim 19, comprising a wide field of view lens attachment lens assembly that includes two meniscus lenses.

\* \* \* \* \*